United States Patent [19]
Bartz

[11] 3,760,373
[45] Sept. 18, 1973

[54] OPTICAL DATA ENTRY AND DISPLAY SYSTEM

[75] Inventor: Maurice R. Bartz, Rochester, Minn.

[73] Assignee: International Business Machines Corporation, Armonk, N.Y.

[22] Filed: Dec. 20, 1971

[21] Appl. No.: 209,911

[52] U.S. Cl. ........... 340/172.5, 340/324, 250/213 A
[51] Int. Cl. ........................................ G08b 5/22
[58] Field of Search ................ 340/172.5, 336, 224; 235/157; 315/169 TV; 250/213 A, 220 M

[56] References Cited

UNITED STATES PATENTS

| | | | |
|---|---|---|---|
| 3,651,509 | 3/1972 | Ngo | 315/169 TV X |
| 3,487,371 | 12/1969 | Frank | 340/172.5 |
| 3,673,579 | 6/1972 | Graven | 250/213 A X |
| 3,479,517 | 11/1969 | Bray et al. | 250/213 A |
| 3,174,144 | 3/1965 | O'Neill | 340/336 |
| 3,580,421 | 5/1971 | Bickford | 340/336 X |
| 3,106,696 | 10/1963 | Foley | 340/336 X |
| 3,680,049 | 7/1972 | Tsukada | 250/220 M |
| 3,509,408 | 4/1970 | Holz | 315/169 TV |
| 3,543,240 | 11/1970 | Miller et al. | 340/172.5 |

*Primary Examiner*—Paul J. Henon
*Assistant Examiner*—Mark Edward Nusbaum
*Attorney*—J. Michael Anglin, Carl W. Laumann, Jr., J. Jancin, Jr. and Richard C. Sughrue et al.

[57] ABSTRACT

Data in the form of characters to be entered into a data processing system are traced by a light pen on a tablet consisting of an array of light emitting diodes forming segments of a pattern containing all the segments necessary to form all desired characters. All of the diodes in the array are sequentially pulsed on and off at such a high rate that the resulting light pulses are invisible to the human eye, but are sensed by the light pen which transmits corresponding electrical pulses to a register which stores the segments corresponding to the traced character. After a complete character is stored, it is displayed on the tablet by continuously energizing the same diodes corresponding to the segment pattern stored in the register. After the displayed character is verified as a correct character, the contents of the register are decoded and transmitted to a central processing unit. When the receipt of the character is acknowledged by the central processing unit, the system is reset for the entry of another character. If the displayed character is incorrect, the display and register are erased, and the character is re-entered.

11 Claims, 3 Drawing Figures

OPTICAL DATA ENTRY AND DISPLAY SYSTEM

BACKGROUND OF THE INVENTION

1. Field of the Invention

The invention relates generally to the field of data processing, and more particularly, to an optical data entry and display system including an array of light sources on which a desired character is traced by a light pen after which the traced character is continuously displayed by the same light sources for verification before transmission of the character to a central processing unit.

2. Description of the Prior Art

Typical prior art data entry systems are exemplified, for example, by U.S. Pat. No. 3,487,371. In this type of system, a character is entered into a computer by writing the character with a light pen on an entry tablet. The character is then fed to a data processor, which, if it properly recognizes the character, causes the recognized character to be displayed on a display separate from the entry tablet. In such a system, the character is actually entered into the computer before it is displayed for verification and, furthermore, a separate display means is required to display the recognized character for verification.

SUMMARY OF THE INVENTION

The object of the present invention is to provide a novel optical data entry and display system in which data to be entered into a data processing system is first displayed for verification before it is entered into the data processing system.

Another object of the invention is to provide such an optical data and display system in which the same light sources used in the tablet for entering the data into the processing system is also used for continuously displaying the data, thereby eliminating the need for a separate display means for verification purposes.

The invention may be broadly summarized as a novel optical data entry and display system comprising an entry tablet having an array of sequentially energized light sources over which a light pen is traced in a path which forms a desired character. The traced character is stored in a register before it is transmitted to a central processing unit. After all segments of a character are stored, the same light sources are continuously energized to display the traced character for verification. After the character is verified by a human operator, the stored character is decoded and sent to the central processing unit. In another embodiment of the invention, a plurality of characters may be traced on a corresponding plurality of arrays of light sources. All the traced characters are stored in registers, and all the stored characters are then simultaneously displayed for veri-fication by continuously energizing all of the light sources corresponding to the stored characters. After all the characters are verified, they are then decoded and transmitted sequentially to the central processing unit.

DESCRIPTION OF THE PREFERRED EMBODIMENTS

Figure 1:
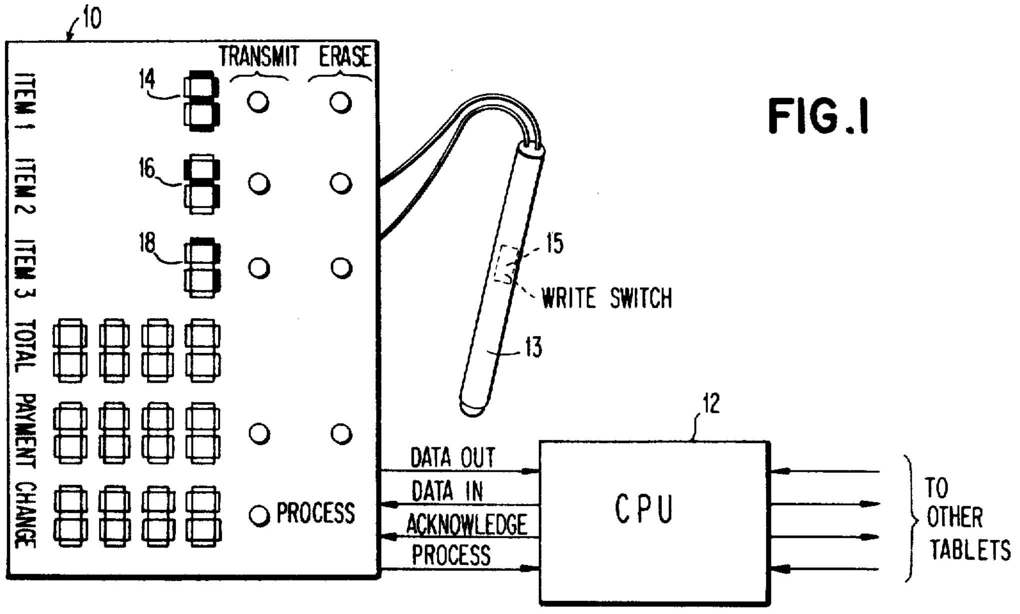
FIG. 1 is a block diagram showing the general organization of the novel optical data entry and display device in communication with a central processing unit.

FIG. 1 shows the general organization of the invention, including a data entry tablet 10 connected to a central processing unit (CPU) 12 and a light pen 13.

The tablet 10 contains at its surface a plurality of light sources, such as light emitting diodes, which are arranged to form a segmented pattern from which alphanumeric characters can be formed. Each segment of a pattern is formed by one diode. For purposes of illustration only, three item lines of data formed by segmented patterns are illustrated for the tablet 10 in FIG. 1. For example, ITEM 1 shows the numeral "3" formed from the segmented pattern 14; ITEM 2 shows a numeral "4" formed from the segmented pattern 16; and ITEM 3 shows a numeral "7" formed from the segmented pattern 18. As will be discussed below with respect to FIG. 3, each of these ITEMS may consist of additional patterns from which other characters may be formed.

Again, as an illustration, tablet 10 is shown to contain a TOTAL line consisting of four segmented patterns and is used to display the total of ITEMS 1, 2 and 3 as computed by the CPU. The PAYMENT line also consists of four segmented patterns to permit entry and display of the amount of the payment made by a customer. The CHANGE line also consists of four segmented characters for displaying the difference between the total sales price and the payment by the customer as computed by the CPU.

Associated with each of the lines corresponding to ITEM 1, ITEM 2, ITEM 3 and PAYMENT are TRANSMIT and ERASE switches. The tablet 10 also contains a PROCESS switch. All these switches may be either mechanical micro-switches or light-actuated switches. Light pen 13 also contains a WRITE switch 15 which also may be either mechanical or light actuated.

A brief description of the operation of the invention will now be presented with respect to FIG. 1. All of the light emitting diodes are strobed or sequentially energized at a rate which is not detectable by the human eye but which is detectable by the light pen 13. In order to enter a numeral 3 in ITEM 1, for example, the WRITE switch is closed to permit the light pen to sense the light pulses emitted by the light emitting diodes. The light pen is then placed sequentially over the light emitting diode segments forming the numeral 3. Once the complete character is traced by the light pen, the invention then operates to continuously energize those light emitting diode segments corresponding to the numeral traced. Therefore, the operator has a visual display of the entered character to permit him to verify that the correct character is entered. After verification, the PROCESS switch is closed to transmit the entered data along the line DATA OUT to the CPU 12. When the CPU has accepted this data, an ACKNOWLEDGE signal is transmitted along the ACKNOWLEDGE line to the tablet 10 to reset the circuits and permit entry of the next character. If the displayed character is not verified as the correct one, the ERASE switch is closed to reset the circuits and permit re-entry of the correct character.

After data for the desired number of ITEMS has been entered, the PROCESS switch is closed to send a PROCESS signal along the PROCESS line to the CPU, thereby instructing the CPU to calculate the total, which is then transmitted along the DATA IN line to the tablet to display the total on the TOTAL line on the tablet. The operator then again traces on the segmented patterns of the PAYMENT line the payment received from the customer, obtains a display of the payment for verification, and when verified, again closes the PROCESS switch to send the payment to the CPU. The CPU then calculates the difference between the total and the payment as the change, and the amount of the change is displayed on the CHANGE line of the data entry tablet 10.

Figure 2:
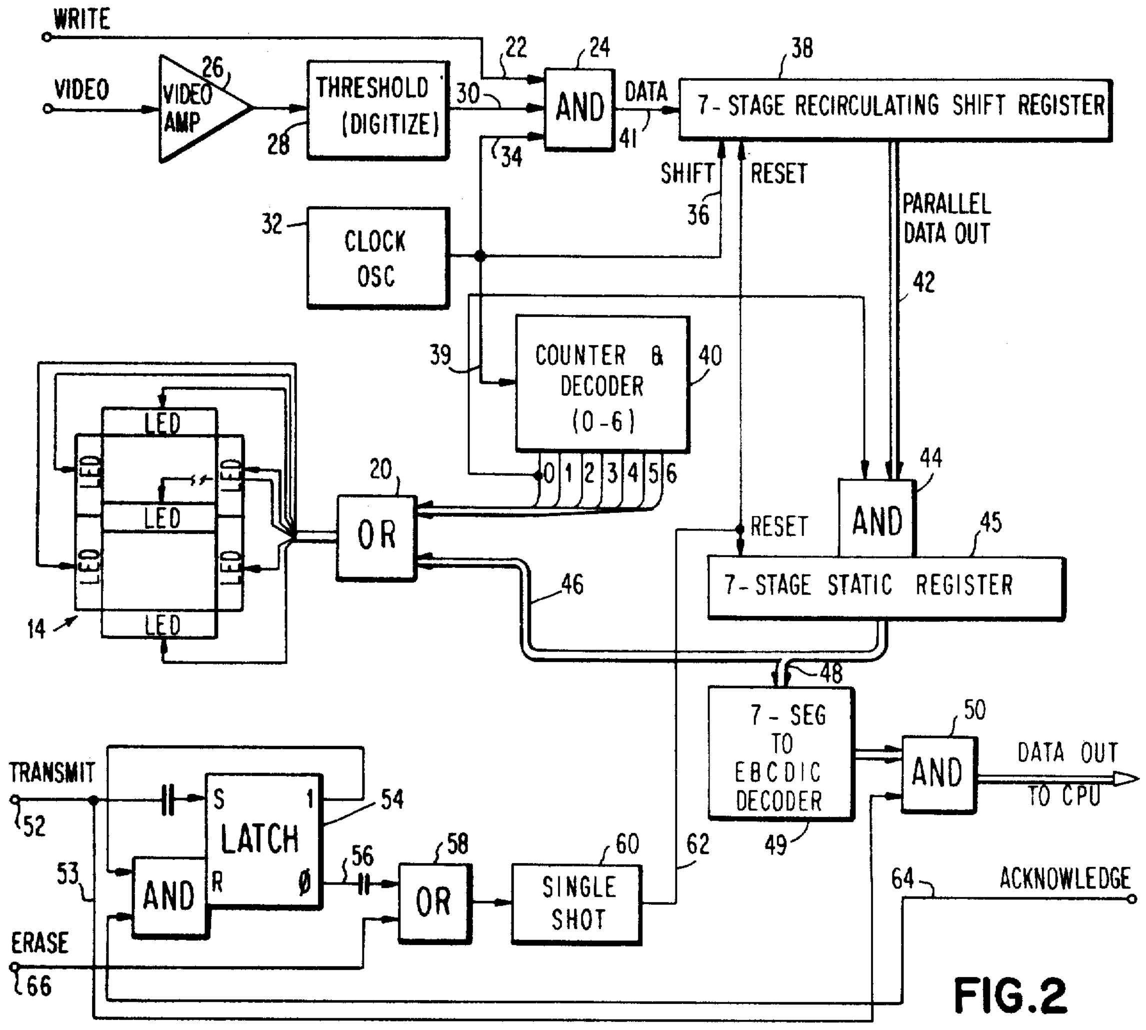
FIG. 2 is a more detailed block diagram of one embodiment of the novel optical data entry and display device illustrated in FIG. 1.

FIG. 2 illustrates the details of one preferred embodiment of the invention which was broadly described above with respect to FIG. 1. In FIG. 2, the operation with respect to only one of the segmented patterns, such as pattern 14, will be described. As shown, each of the segments of the pattern is formed by a light emitting diode (LED) of the type shown on pages 191-196 of Semiconductors from A to Z, Dahlen, 1968. Each of the LED's is connected via a conductor to the output of an OR circuit 20. A LIGHT SWITCH signal, corresponding to the closure of the light switch in the light pen and indicating contact of the light pen with a segment of a pattern, is applied to the input 22 of an AND circuit 24. The VIDEO or light signal produced by the light pen is applied to a VIDEO amplifier 26 whose output is fed through a digitizing threshold circuit 28 to the input 30 of AND circuit 24. The output of a clock oscillator 32 is fed to the input 34 of AND circuit 24, to the shift input 36 of a seven-stage recirculating shift register 38, and also to the input 39 of a seven-stage counter and decoder 40. The seven output terminals of the counter and decoder 40 are connected to one input of the OR circuit 20 to permit the output of the clock oscillator to sequentially energize or strobe the LED's of the display pattern 14 so that all the LED's sequentially produce light pulses at a rate not detectable by the human eye. The circuitry referred to in this paragraph has been well known in the art for many years, for example counter and decoder 40 may be of the type shown on pages 340–342, 354–362 of Fitchen, *Electronic Integrated Circuits and Systems, Van Nostrand*, 1970. Similarly, in the same publication a recirculating shift register 38 is disclosed on pages 332–336, a video amplifier 26 is disclosed on pages 213, 214 and a threshold circuit 28 is shown on pages 312–315.

Each stage of the recirculating shift register 38 corresponds to one of the seven LED's forming the segments of the pattern 14. The segments traced by the light pen 13 are fed along the data line 41 to the input of the recirculating shift register 38. When a complete character has been entered, it is read out in parallel along the data bus 42 and applied through AND circuits 44 and gated by the 0 or first stage output of the counter and decoder 40 to a seven stage static register 45. The character stored in register 45 is then fed in parallel via bus 46 through the OR circuit 20 to continuously energize the same LED's of pattern 14 which were traced by the light pen. Simultaneously, the output of the static register 45 is applied by another bus 48 to a decoder 49 whose output is connected to one input of an AND circuit 50 which may be subsequently gated by actuation of the TRANSMIT switch. Decoder 50 places the data in suitable form for acceptance by CPU 12.

After the entered character is displayed by the continuous energization of the LED's in pattern 14, and the displayed character is verified by the operator as a correctly entered character, then the TRANSMIT switch is closed to apply a TRANSMIT signal to a terminal 52. The TRANSMIT signal is transmitted via a line 53 to a second input of AND gate 50 to gate the decoded character to the CPU 12 along the data out line. The TRANSMIT signal on the terminal 52 is also applied to the set input of a latch 54 to set the latch. The reset output of the latch is connected via line 56 and an OR circuit 58 to the input of a single shot 60 whose output is connected via line 62 to the reset terminals of the recirculating shift register 38 and static register 45. After the CPU has accepted the data, it transmits on line 64 an ACKNOWLEDGE signal which is applied to the reset input terminal of latch 54 to reset the latch and trigger single shot 60. The single shot 60 produces on line 62 a pulse of length sufficient to registers 38 and 45 to permit entry of another character.

If the displayed character is not verified as the correct one, the ERASE switch is closed to produce an ERASE signal on terminal 66. This signal is also fed via OR circuit 58 to the input of single shot 60 to reset the registers and permit the re-entry of the correct character.

Figure 3:
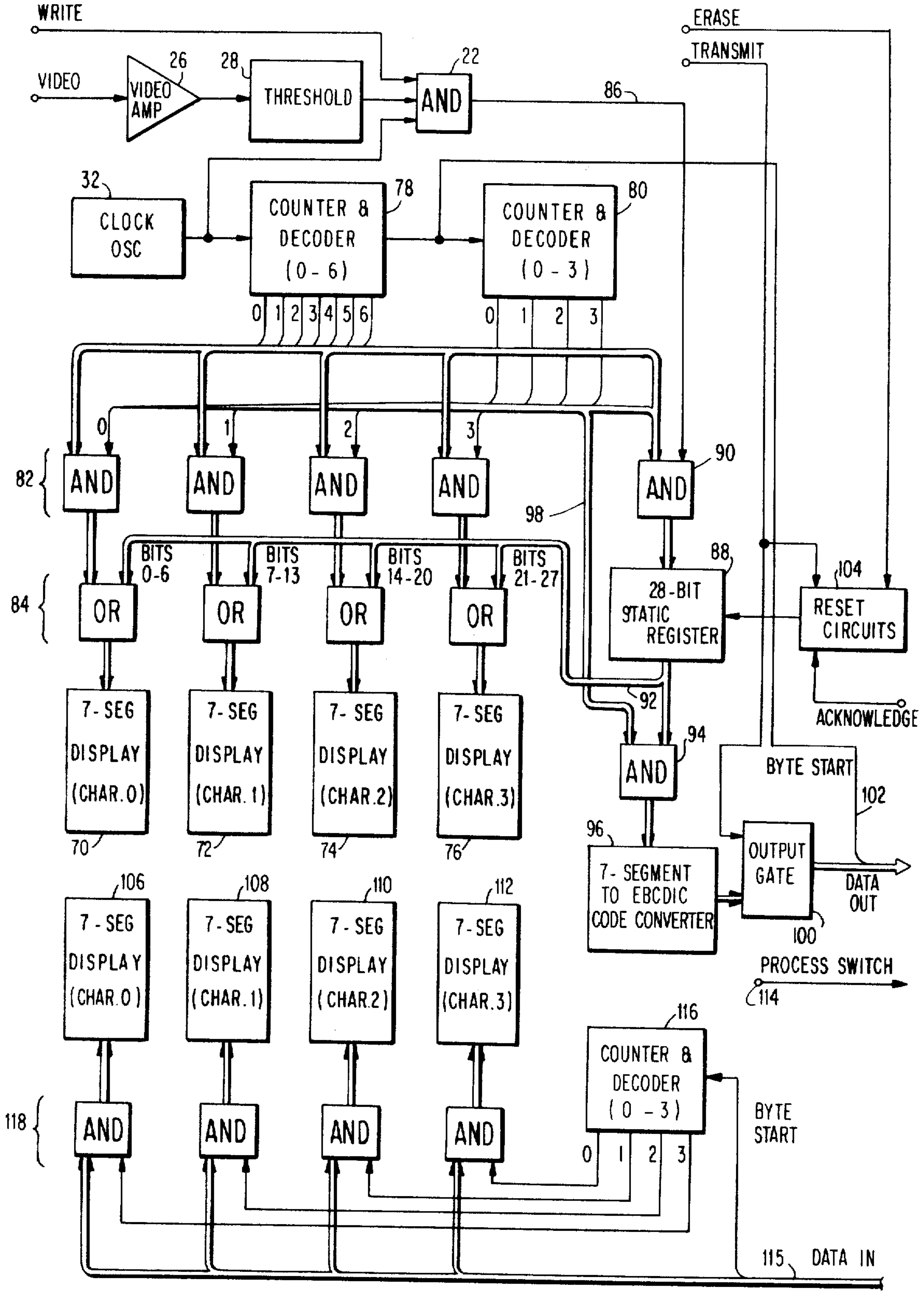
FIG. 3 is a more detailed block diagram of another embodiment of the novel optical data entry and display device illustrated in FIG. 1.

FIG. 3 illustrates an embodiment of the invention wherein multiple characters or digits may be entered simultaneously from the data entry tablet 10. In this embodiment, it is assumed that in ITEM 1, for example, of the tablet 10 illustrated in FIG. 1, there are four segmented display patterns, and it is desired to enter on these patterns four digits or characters and display them for verification before they are transmitted to the CPU. These four segmented patterns are indicatdd by blocks 70, 72, 74 and 76 in FIG. 3 which are labelled 7 - SEGMENT DISPLAY and correspond, respectively, to characters 0, 1, 2 and 3. In this circuit, each LED segment of each of the four display patterns is pulsed once every 28 clock cycles. The pulsing of each of the display 70, 72, 74 and 76 requires one complete cycle of a counter and decoder 78, while another counter and decoder 80 rotates the pulse from counter 78 through AND circuits 82 and OR circuits 84 to different ones of the display patterns. Video pulses on line 86 are gated into a 28 bit static register 88 through AND circuits 90 which receive gating pulses from both counters 78 and 80. This entry technique is an alternative to the use of the recirculating shift register 38 of FIG. 2, and either technique may be used in either of the circuits of FIGS. 2 and 3.

Line 92 carries the appropriate bits from register 88 to OR circuits 84 and from there to each of the corresponding displays 70, 72, 74 and 76 to provide for the continuous illumination of the previously detected video signals corresponding to the characters traced by the light pen.

The output of the static register 88 is also gated in blocks of seven bits each through AND circuits 94 to a code converter 96 by signals from the counter 80 which are carried on the line 98. The sequential outputs of converter 96 are gated by the TRANSMIT switch signal through output AND gates 100 to the data out line connected to the CPU. In this embodiment, however, the TRANSMIT switch data signals must be synchronized to counter 80 in order to output the digits or characters in the correct order. Line 102 provides a BYTE START signal for separating the data signals during transmission. Reset circuits 104 may be constructed in a manner similar to that shown in FIG. 2 for resetting the static register 88 after the occurrence of an ERASE switch signal or the occurrence of a TRANSMIT switch signal followed by an ACKNOWLEDGE signal from the CPU.

The seven segment displays 106, 108, 110 and 112 correspond, for example, to either of the TOTAL or CHANGE lines of the tablet 10 illustrated in FIG. 1 and receive computational results from the CPU after computation has been initiated by operation of a PROCESS switch 114. A counter and decoder 116 receives BYTE START signals from the CPU via the data in line 115 to route the digits received from the CPU to the proper one of the displays 106, 108, 110 and 112 through corresponding AND gates 118. Although the displays 106, 108, 110 and 112 do not include the strobing or sequential energization circuitry associated with a display 70, 72, 74 and 76, it is, of course, contemplated to be within the scope of the invention to use the same physical LED segmented patterns both for the entry of data into the CPU and for the receipt of computational results of the CPU.

While the invention has been particularly shown and described with reference to the preferred embodimentsthereof, it will be understood by those skilled in the art that various changes in form and details may be made therein without departing from the spirit and scope of the invention.

I claim:

1. An optical data entry and display system comprising;

a. a first array of light sources disposed in a configuration capable of representing any character belonging to a predetermined set of characters;

b. clock means for cyclically energizing said sources so that said sources emit pulses of light;

c. manually operable data entry means for tracing a desired character from said predetermined set, said data entry means including a light detector for sequentially sensing the light pulses emitted from selected ones of said sources corresponding to said desired character;

d. circuit means coupled to said data entry means and to said array for continuously energizing said selected ones of said light sources to continuously display a standardized image of said character on said display; and e. decoder means coupled to said data entry means for producing an output code representing the identity of said character.

2. An optical data entry and display system as defined in Claim 1 wherein said circuit means comprises:

a. storage means connected to said data entry means for storing said desired character; and b. means coupled between said storage means and said array for continuously energizing said selected sources corresponding to said stored character.

3. An optical data entry and display system as defined in Claim 2 wherein said data entry means comprises a light pen, and said light sources are light emitting diodes.

4. An optical data entry and display system as defined in claim 2 further comprising a central processing unit for processing said character, and switch means for transmitting said output code to said central processing unit.

5. An optical data entry and display system as defined in claim 4 further comprising means responsive to a signal from said central processing unit for resetting said storage means.

6. An optical data entry and display system as defined in Claim 4 comprising an additional array of light sources coupled to said central processing unit for displaying the result of the processing of a plurality of characters transmitted to said central processing unit.

7. An optical data entry and display system as defined in Claim 2 wherein said storage means comprises a shift register having a number of stages equal to the number of said light sources for storing signals representative of the selected light sources.

8. An optical data entry and display system as defined in Claim 7 wherein said storage means further comprises a static register coupled between the output of said shift register and said means for continuously energizing said selected sources, and means coupled to said clock means for gating a complete character from said shift register to said static register.

9. An optical data entry and display system as defined in Claim 2 further comprising a second array of light sources identical to said first array, and wherein said storage means comprises register means for simultaneously storing first and second characters corresponding to the selected sources in both arrays, and means for simultaneously energizing the selected sources in both arrays to simultaneously and continuously display said first and second characters.

10. An optical data entry and display system as defined in claim 9 further comprising a central processing unit for processing said characters and means for serially transmitting output codes representing the identity of the displayed characters to said central processing unit.

11. An optical data entry and display system as defined in Claim 10 further comprising means responsive to a signal from said central processing unit for resetting said register means.

* * * * *